United States Patent [19]

Granryd

[11] Patent Number: 5,242,214
[45] Date of Patent: Sep. 7, 1993

[54] TRACTION ENHANCING DEVICE INCLUDING FLEXIBLE FRAME MEANS FOR AGRICULTURAL WHEELED TRACTORS AND THE LIKE

[75] Inventor: Thorvald G. Granryd, Wilmington, Ill.

[73] Assignee: Omitrac Corporation, North Chicago, Ill.

[21] Appl. No.: 855,271

[22] Filed: Mar. 23, 1992

[51] Int. Cl.$^5$ ............................................ B60C 27/20
[52] U.S. Cl. ..................................... 301/45; 301/41.1; 301/38.1
[58] Field of Search ................. 301/45, 47, 50, 51, 301/38.1, 40.1, 41.1, 44.1, 44.4

[56] References Cited

U.S. PATENT DOCUMENTS

| | | | |
|---|---|---|---|
| 1,102,274 | 7/1914 | Kelly | 301/40 R |
| 1,404,051 | 1/1922 | Ollivier | 301/45 |
| 1,497,092 | 6/1924 | Delieuvin | 301/45 |
| 4,402,357 | 9/1983 | Granryd | 152/218 X |
| 4,508,150 | 4/1985 | Granryd | 152/225 X |
| 4,603,916 | 8/1986 | Granryd | 152/213 A X |
| 4,694,872 | 9/1987 | Granryd | 152/216 |

FOREIGN PATENT DOCUMENTS

| | | | |
|---|---|---|---|
| 91581 | 8/1922 | Austria | 301/38 R |
| 1100048 | 9/1955 | France | 301/51 |

OTHER PUBLICATIONS

American Society of Agricultural Engineers, "Dyna Bite Tractor Tire Attachment Performance in Clay Soil", vol. 29(5) (1986) J. Walker.
American Society of Agricultrual Engineers, "Comparative Evaluation of FWDA to TWO-Wheel Drive Tractors", Paper No. 86-1067 (1986) L. Shell, R. Fox and K. Moss.

Primary Examiner—Russell D. Stormer
Attorney, Agent, or Firm—Wall and Roehrig

[57] ABSTRACT

There is disclosed a traction enhancing device for a wheeled agricultural tractor, in which a flexible frame comprises a circular band, to which are welded a series of spade holders. The frame is bolted to the rim of the wheel by spacers, so that the frame is in non-contacting relationship with the tire. The spade holders are fabricated from flat stock of high strength spring-like steel, formed into a semicircles, and have outer tubular anchors. These anchors encircle a plurality of wire ropes that lie in mutual end-to-end relationship and described a circle that is concentric with the wheel. A series of spade assemblies are rigidly fastened on the wire ropes. The wire ropes are preloaded, and can be rotated within the anchors so that the spades assemblies alternate between a ground-engaging position and a ground-avoiding position. The spades each include lugs that slice into the strong subsurface layers of the soil, and provide a significant degree of traction improvement as the wheel turns. The flexible frame and spades follow the tire's contour, thereby forming its own elongated footprint as the wheel turns. As there is no contact between the frame and tire, riding comfort is not adversely affected even at heavy pull on a dry soil surface. Under the influence of vertical load and drawbar pull the device deforms as the spades penetrate into the soil. The dimensions of the spade holders and their spring-like elasticity allows structural compression to repeatedly occur without permanent deformation.

20 Claims, 8 Drawing Sheets

TRACTION ENHANCING DEVICE INCLUDING FLEXIBLE FRAME MEANS FOR AGRICULTURAL WHEELED TRACTORS AND THE LIKE

BACKGROUND OF THE INVENTION

This invention relates generally to an apparatus and method for obtaining improved tractive performance of agricultural wheeled tractors without sacrificing riding comfort during field operations. Reference is made to the following U.S. Pat. Nos. 4,694,872, 4,603,916, 4,508,150, and 4,402,357 the disclosures of which are incorporated herein by reference.

In the above disclosures the performance of a pneumatic tire for a tractor's drive wheels are reviewed and methods for improving productivity and reducing soil compaction are shown.

The shortcomings of farm drive-tires during field operations are well known in the art. To offset their often suboptimum performance in soils a variety of methods and means for enhancing traction have become standard practice; such as adding weight by means of liquid ballast and cast iron wheel weights, the use of dual or triple drive tires, employing four wheel drive by means of both so-called articulated design and so-called Front Wheel Drive Assist (FWDA).

The last approach has become increasingly popular in recent decades as the trend to heavier and more powerful tractors evolved, resulting in inadequate tractive performance of the regular Two-Wheel-Drive (2WD) type farm tractor, generally due to excessive rate of tire slip, regardless of the amount of ballast weight added. However, none of these techniques has provided a complete solution. The 1986 ASAE Paper No 86-1067 (ASAE: American Society of Agricultural Engineers) provides an illuminating example of the present state of the art and is entitled COMPARATIVE EVALUATION OF FWDA to TWO-WHEEL DRIVE TRACTORS. (Prof. L. R. Shell et al., Southwest Texas State University). The paper discusses (1) the cost of the FWDA device; and (2) the tractive performance of the 2WD configuration.

In regard to (1), the introduction begins with "Does the Front Wheel Drive Assist (FWDA) tractor possess enough advantage over the two-wheel drive (2WD) to justify its additional cost? In other words, "do front wheel drivers pay? This question is one that is being asked by farmers contemplating the purchase of a tractor, especially those who are considering 75 kW PTO (100 PTO HP) tractors or larger, for the additional cost may be 15% or more of the purchase price." And, in regard to (2) the Paper contains a printout, dated May 21, 19867, showing the tractive performance of a 104 PTO kW (140 PTO HP) 2WD tractor, equipped to operate "to its best advantage" and pulling in moist to dry sand." The Test Data are telling:

POWER=57 HP (42.23 kW); i.e., amount of drawbar power transmitted to the implement—and the "end product; and produced from two recorded factors, namely DRAWBAR PULL=5,064 LB (22.52 kN) and SPEED=4.2 MPH (6.75 km/h) i.e., tractor's ground speed—as opposed to its wheel speed—reduced due to SLIP=24%; meaning that tractor's wheel speed was no less than 4.2/(1−0.24)=5.5 MPH (8.8 km/h). Also shown in printout is—

FUEL CONSUMPTION=8.70 gal/h (32.92 L/h) and the resulting Fuel Efficiency=6.51 HPh/gal (1.28 kWh/L).

Data such as the above serve to explain why farmers demand better performance on their 2WD tractor, and the dramatic increase in sales of the FWDA option in spite of its high additional cost. A farmer has no way of knowing that his new 140 PTO HP (PTO HP=Power Take Off Horsepower) 2WD typically delivers a mere 41 percent of its advertised max.HP (57/140), even though equipped with duals of oversize drive tires (20.8-38), and ballasted to weigh no less than 20,516 pounds (9,306 kg) in order to function "to its best advantage". His tractor's drawbar pull is only 25 percent of total tractor weight (5,064/20,516), even though the tractor's four brand new drive tires slip at a 24% rate—meaning that one of four tire revolutions are wasted as tire wear and heat. In consequence, the tractor's Fuel Efficiency (measurable as drawbar power produced for each unit of fuel per hour consumed) is a modest 6.51 HPh/gal (57/8.70) and 1.28 kWh/L (42.23/32.92), approximately half of that obtained on the concrete test course in the official Nebraska Tractor Tests.

While the FWDA device has become a standard option from tractor manufacturers, tire makers are continuing their attempts to improve the characteristics of farm tires, both bias ply and radial ply types. Much of the research is focused on the configuration and spacing of the tire lugs.

In explaining the mediocre performance exhibited in the above-cited ASAE paper, reference is again made to the above-noted U.S. Pat. No. 4,508,150, wherein it is stated that the maximum "terra-dynamic" efficiency averages 65% based on tests conducted by National Institute of Agricultural Engineering, Silsoe, England as reported by Dwyer et al. in 1976. More recent findings by other research institutions indicate that no further significant improvement in traction efficiency has been achieved. This may be a result of the wide variety of tasks that a farm tractor is called upon to perform; it encounters a wide range of soil conditions when pulling implements in fields, and it must have satisfactory tire life and a smooth ride while traveling on concrete roads. It thus can be said that the design of a farm tire becomes an exercise in "compromise" engineering.

A major U.S. tire manufacture, in a recent advertisement, sums up this situation succinctly in referring to its line of farm tires: "Three of the more important tire performance criteria are traction, vibration, and self cleaning ability. Ironically as you improve one aspect, trade offs may occur with the others." As the ad deals with its new high traction tire, it tells about the improvement in traction over other tires. The ad states: "WITH SUCH GREAT TRACTION, WHO WOULD EXPECT REDUCED VIBRATION, TOO"? It explains that vibration was reduced by refinement in lug configuration and lug spacing, along with the already accepted innovation of the so-called "long-bar/short-bar" tread design now offered by most farm tire makers. From this one may conclude that the price for attaining "great traction" is generally a bumpy and uncomfortable ride in the fields.

An article entitled "Long-bar/short-bar: Pulling for a smoother ride" (in the booklet "FARM TIRE HANDBOOK III" by Successful Farming, 1988, Des Moines, Iowa) says, in part, referring to conventional tread bar design: "But, heavy, spaced out lugs on conventional tires, coupled with bigger tractors, quiet cabs and more road travel, often causes serious vibration when tractors are driven on hard surfaces. . . . The resultant impact on the driver can be very disturbing."

Referring to the above-noted ASAE Paper No. 86-1067, the report does not state the traction performance of an accompanying FWDA tractor; it does, however, contain a chart indicating that its fuel efficiency was some 15 percent better than that of the 2WD-tractor. That even large Four-Wheel-Drive (4WD) tractors of the so-called articulated design have performance problems in fields is exemplified by a 1991 brochure published by Caterpillar Inc., with the heading "It's Not How Many Horses Could Pull . . . IT'S HOW MANY DO!." There is cited comparative test data for 4WDs vs Caterpillar's innovative rubber belted agricultural tractor model Challenge 65; . . . conducted by the Center For Agricultural Equipment (formerly the Nebraska Tractor Testing Laboratory) University of Nebraska, Lincoln, during Fall, 1988.

The following table from the Caterpillar brochure describes not only the relative improvement obtained with Caterpillar s so-called Mobil-trac System but also compares its performance on concrete and in soil:

|  |  | Drawbar Horsepower | MPH | % Slip |
|---|---|---|---|---|
| Challenger 65 | concrete | 206 | 4.6 | 1.62 |
| (270 HP) | soil | 200 | 4.5 | 2.55 |
| 4 Wheel Drive | concrete | 213 | 4.4 | 6.3 |
| (280 HP) | soil | 168 | 3.7 | 19.9 |

The brochure emphasizes that "Four wheel drive tractors convert only 60% of engine power to drawbar power.". This 60% factor is compared with 41% for the regular 2WD in the above. It is noteworthy that the brochure refers to performance in soil; the 168/280=0.60. The brochure further says:

"20% slip on firm soil track."; i.e., the 19.9% shown.

"21% loss of drawbar horsepower from concrete to soil."; i.e., 168/213=0.79.

"16% loss of speed due to traction loss."; i.e., 3.7/4.4=0.84.

And in regard to its Challenger 65, it says, in part, "Nebraska tractor tests conclusively prove the Mobil-trac System on the Challenger 65 delivers the most PULLING POWER." And, "98% of speed retained due to outstanding traction!"; i.e., 4.5/4.6=0.98.

During the 1980s two methods for significantly enhancing traction of agricultural tractors emerged, each employing a different design concept. Clearly, the method of providing a very large "footprint: by means of so-called crawler tractors has been useful since the early days of tractors, albeit with the distinct disadvantage that such vehicles cannot travel on paved roads. This drawback was overcome by replacing the conventional steel track with one of rubber, as introduced in 1987 in the innovative model Challenger 65, discussed in the foregoing. Even though its weight is in order of 31,000 pounds (14,090 kg), its two rubber tracks are large enough to give a ground pressure in the order of 6 pounds per square inch (41.5 kPa), and therefore it is sensitive only to the weaker top layer of the soil. Its 72 rubber grousers per track enable it to transmit 200 drawbar horsepower at only 2.55% slip in soil, less than 1% greater than the slippage on concrete, as is evident from the test data quoted above. This result is contrasted to a nearly fourteen percent difference in the slip rate of the 4WD, also tested. Caterpillar's rubber track concept is thus an effective, albeit costly, method of solving the longstanding traction problem of agricultural tractors. So is the method of utilizing the stronger subsurface layer of soil, having higher "soil values". The above-cited U.S. Pat. No. 4,402,357 includes an analysis, wherein such higher soil values are equated with ballast weight. The effectiveness of the other method which emerged in the 1980's is seen from official tests conducted by University of Arkansas. In ASAE TRANSACTIONS, Vol. 29 (5); Sep.–Oct. 1986, Dr. J. T. Walker reports on the performance of a device, constructed in accordance with the above-cited U.S. Pat. No. 4,508,150 in his article entitled "Dynabite Tractor Tire Attachment Performance in Clay Soil".

The so-called Cone Index is a measure of soil strength and a recent ASAE paper gives an example of how Cone Index increases with soil depth: The article, entitled "Development of a Unique, Mobile, Single Wheel Traction Testing Machine" [ASAE Transaction, Vol. 29(5) Sep.–Oct. 1986; S. K. Upadhyaya et al.] contains a table, entitled "A typical variation of Cone Index with depth", which says, in part, that "average cone index, kPa" is 596 in "Layer 0–50 mm", i.e., the "strength" of the top soil.

By way of example, TABLE 5 in the Walker article shows the difference in performance of a 2WD-tractor. ". . . caused by engagement of the DB3 device relative to performance when disengaged (DB0)", on dry soil and on wet grass. The results are accompanied by the following statement:

"When the DB3 was active on the dry soil surface, speed was increased by 62.3%, slip was reduced by 45%, drawbar power was increased by 64%, fuel efficiency was increased by 51% and fuel/km was decreased by 34%.

On the wet, sodded soil, the speed was increased by 107%, slip was decreased by 86%, power was increased by 85%, fuel efficiency was increased by 79%, and fuel/km was reduced 61% by the DB3.".

The method in accordance with present invention, like the challenger 65, addresses the problems of rubber-tired agricultural tractors, but is far less costly, both in regard to traction per se and in respect to vibration tendency.

SUMMARY OF THE INVENTION

It is therefore an object of this invention to attain outstanding traction of rubber tired vehicles.

It is another object to provide a smooth ride when pulling in soils.

It is a further object to improve tire wear and extend tire life.

Yet a further object is to provide improved traction intensifying means which are readily engaged and retracted.

It is yet another object to reduce soil compaction.

It is still another object to increase productivity and improve fuel economy of agricultural wheeled tractors.

BRIEF DESCRIPTION OF THE DRAWINGS

Further objects of the invention, together with additional features contributing thereto and advantages accruing therefrom, will be apparent from the following description of the preferred embodiments of the inventions which are shown in the accompanying drawings with like numerals indicating corresponding parts throughout, wherein.

DESCRIPTION OF THE PREFERRED EMBODIMENT

Figure 1:
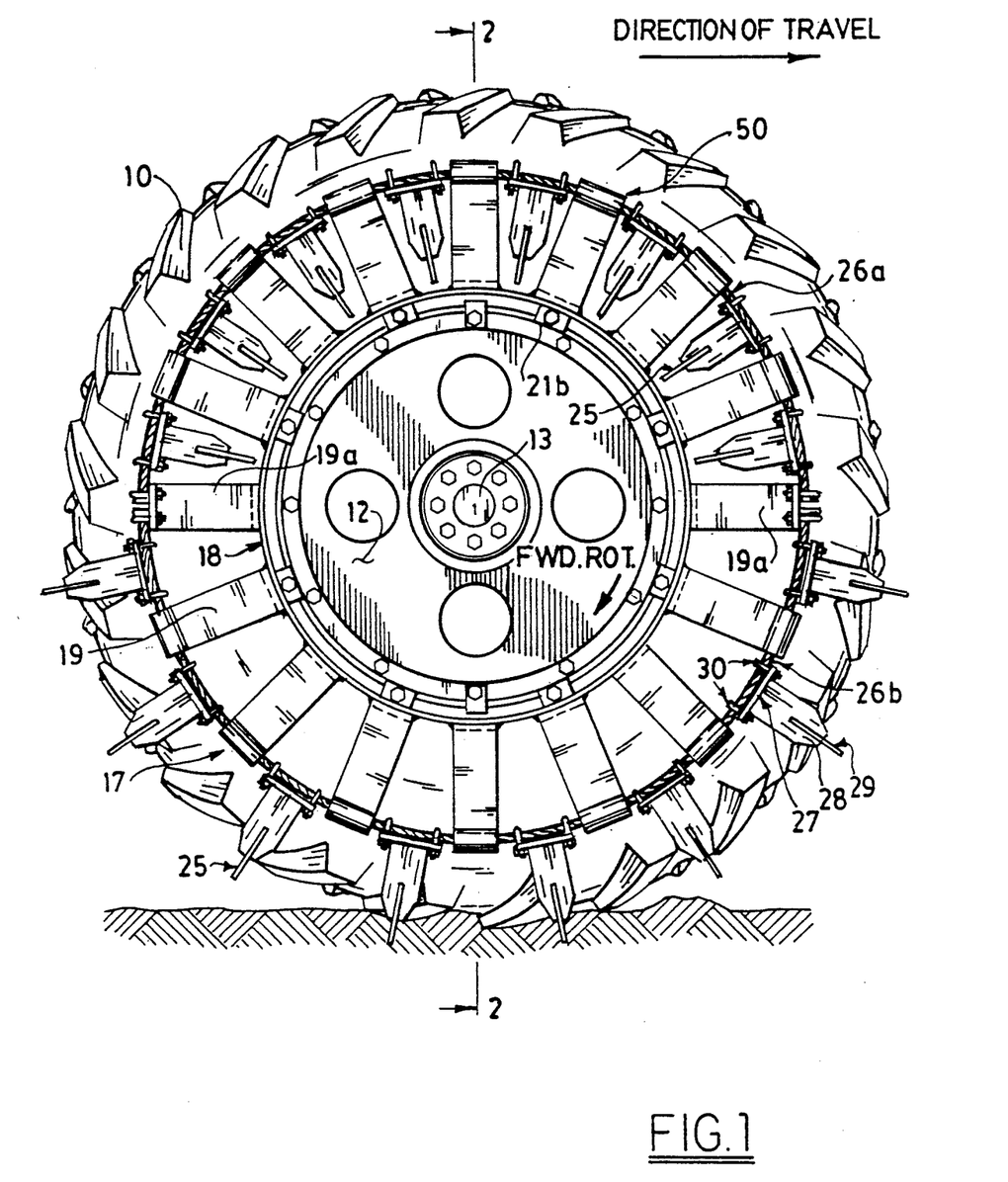
FIG. 1 is a somewhat diagrammatic side elevation of the device in accordance with the invention as mounted on a drive-tire and wheel assembly, the device being shown engaged in the lower part of the diagram and retracted in the upper part.
Figure 2:
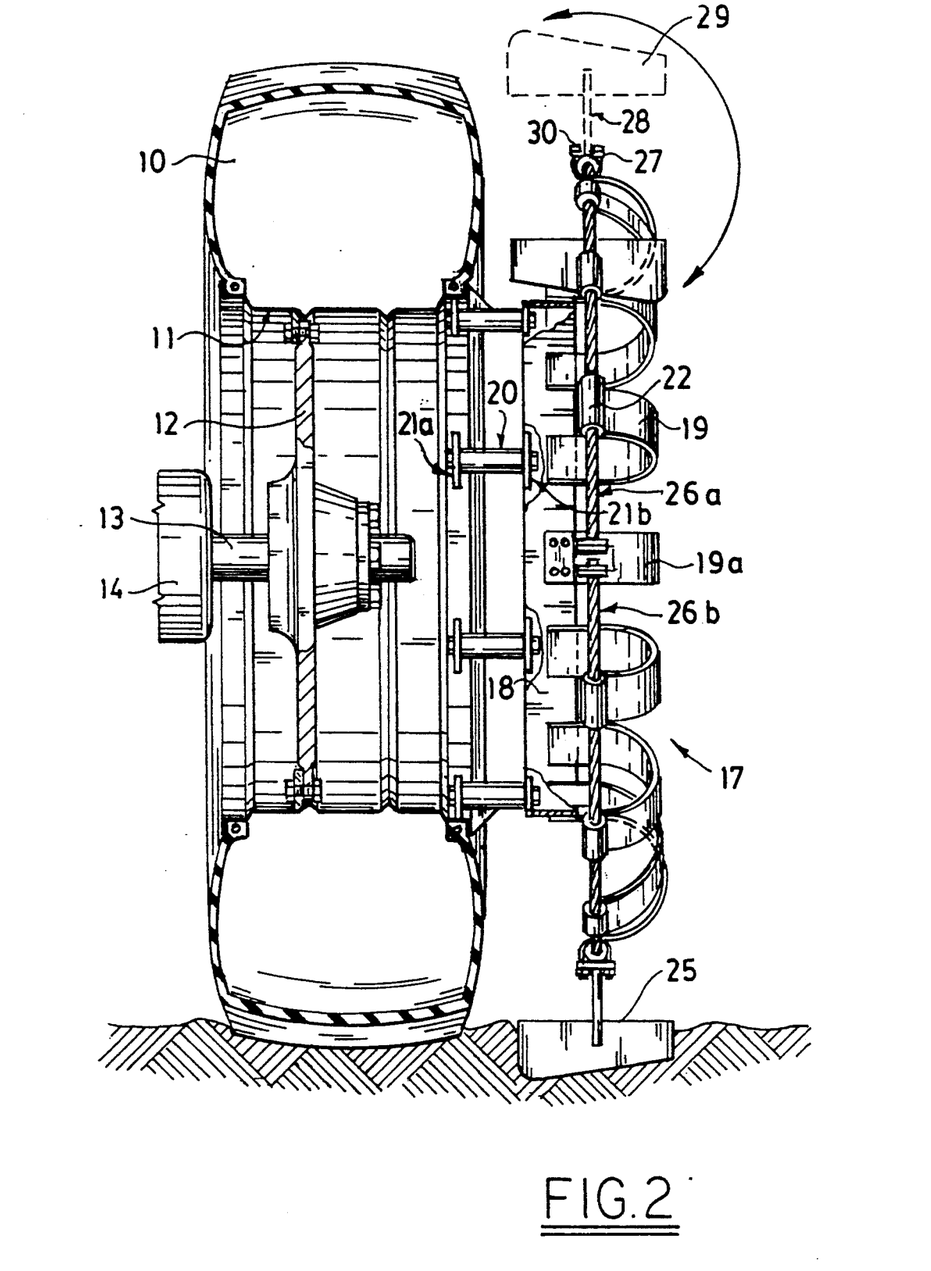
FIG. 2 is a sectional view taken along line A—A of FIG. 1, with some spades omitted for clarity.

Referring to FIGS. 1 and 2, there is shown a tire 10 mounted on rim 11. Rim 11 is secured to wheel disc 12, which is secured to axle shaft 12, protruding from a tractor's rear end housing 14.

The traction enhancing device 17 comprises a circular band 18, to which are welded a series of spade holders 19. Device 17 is bolted to rim 11 by spacers 20, via tabs 21a welded onto rim 11 and tabs 21b welded onto band 18.

Figure 4:
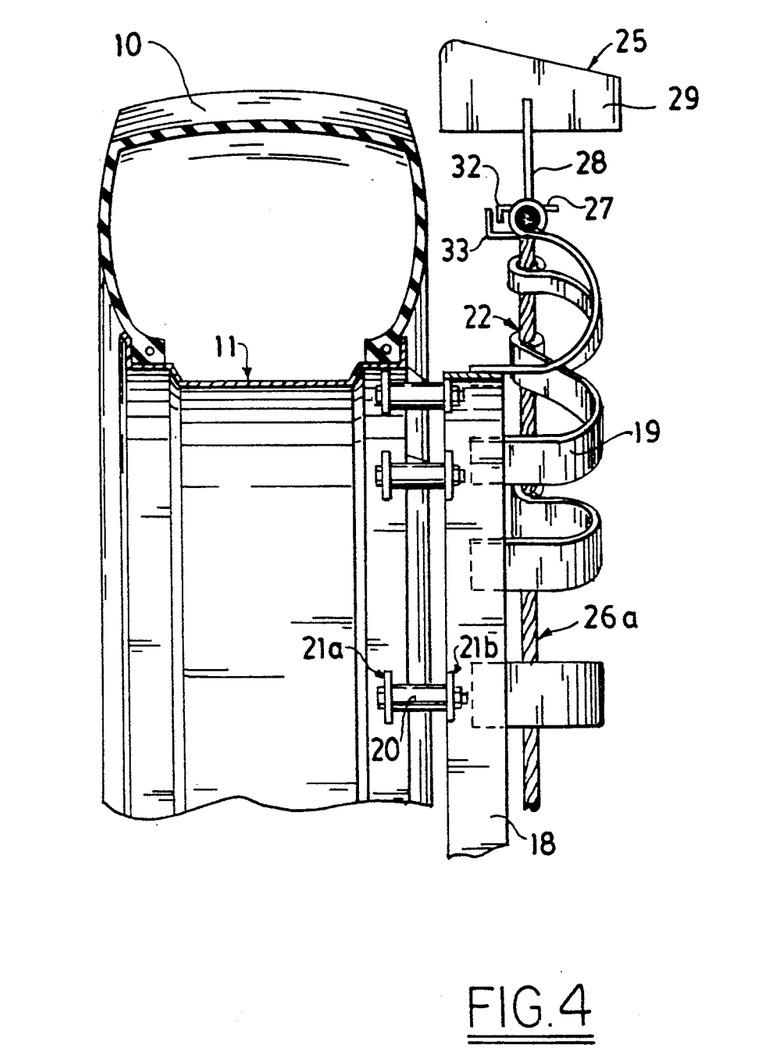
FIG. 4 is a sectional view taken along line B—B of FIG. 3 with all but one spade omitted for clarity.

Spade holder 19, fabricated from flat stock of high strength spring-like steel, is formed into a semicircle as shown in FIGS. 2 and 4; and further is formed to have an anchor, formed of tubular portion 22, at its outer end. Into tubular portion 22 of the series of spade holders 19 are threaded wire ropes 26a and 26b, best shown in FIGS. 8A and 5B, onto which a series of spade assemblies 25 are securely fastened.

The device 17 is so dimensioned as to provide a significant degree of traction improvement; achieved as the lug 29 of spade assembly 25 penetrates into the strong subsurface layer of soil, as indicated in the lower portions of FIGS. 1 and 2. Experience has shown that this device is useful for improving traction in fields.

The present invention differs from the above noted DB3 device in one important respect: As is seen in FIGS. 2 and 4, the device in accordance with the invention is installed adjacent to a companion drive tire, whereas the DB3 device is mounted on, and is an integral part of the companion drive tire.

The present invention employs a frame 50, composed of circular band 18 and spade holders 19 which is flexible. It is secured to the lugs of its companion drive tire, and essentially follows the tire's contour, thereby forming its own elongated footprint as the wheel turns. The flexible frame and connecting spacers of the device in accordance with the invention are in non-contacting relationship with the tire. Thus, riding comfort is not adversely affected even at heavy pull on a dry soil surface.

The desired resiliency of device 17 is accomplished by forming the series of spade holders 19 into a semicircle. Under the influence of vertical load and drawbar pull the device deforms as the spades penetrate into the soil. Test gauges installed on the device show that spade holder 19 will compress an amount equal to about 12% of its semicircular diameter, with a 175 HP (130 kW) 2WD-tractor during heavy pulling. The dimensions of spade holder 19 and its spring-like elasticity allow even greater compression to repeatedly occur without permanent deformation.

Figure 6A:
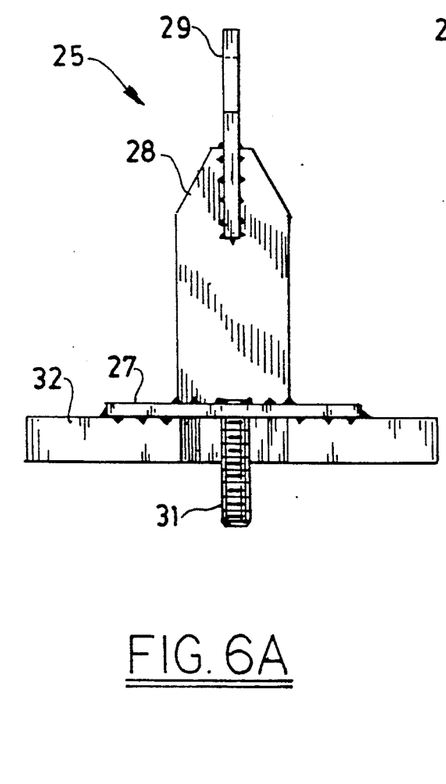
FIGS. 6A, 6B and 6C are detailed side, top and front views respectively of a spade assembly in accordance with the invention.
Figure 6B:
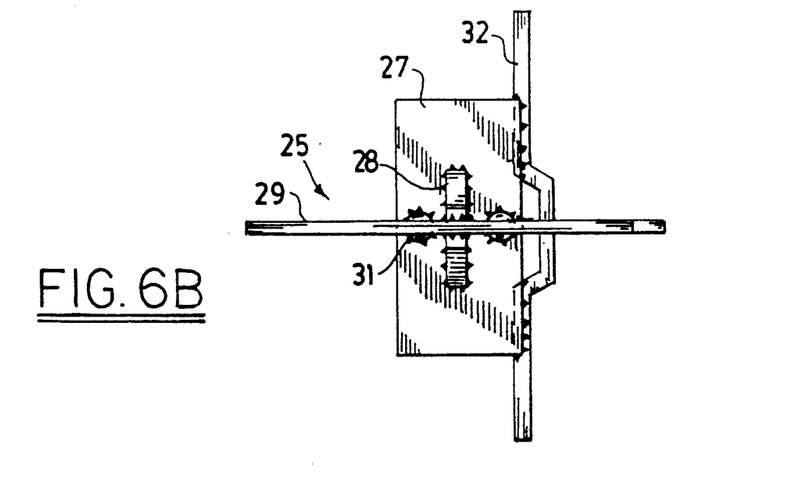
Figure 6C:
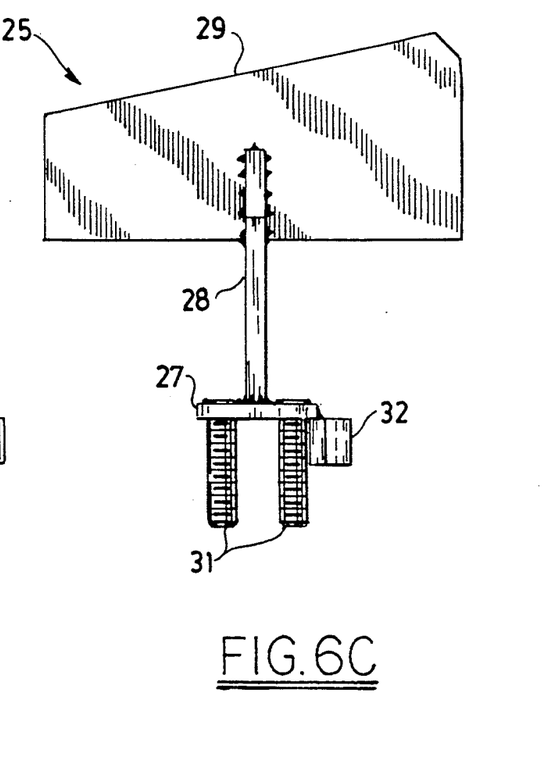

FIGS. 6A, 6B and 6C illustrate spade assembly 25. This is a weldment of the same high strength, spring-like material as used in spade holder 19. Spade assembly 25 comprises a base 27, to which is squarely and perpendicularly welded stem 28. Dovetailed and squarely aligned with stem 28 is welded lug 29. Also welded onto the base 27 are two threaded studs 31 and bar 32 in the configuration shown.

Figure 7A:
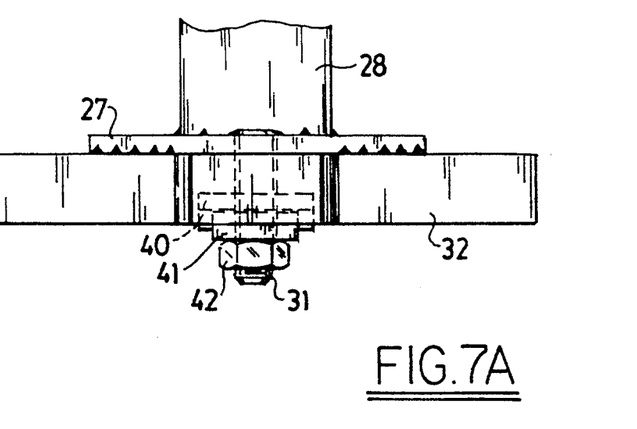
FIGS. 7A and 7B are enlarged side view and sectional view, respectively, of the embodiment of FIG. 3.
Figure 7B:
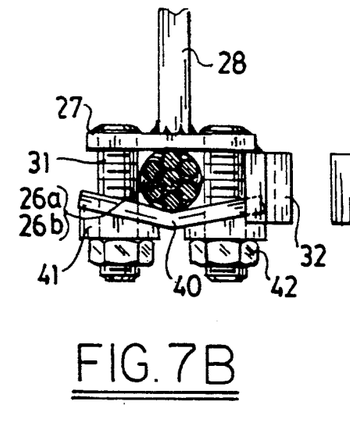

In FIGS. 7A and 7B there is shown spade assembly 25 coupled to the wire ropes 26a and 26b by means of the two threaded studs 31, via beveled bracket 40, two beveled washers 41 and two nuts 42. This is the arrangement shown in FIG. 3, whereas FIG. 1 shows an alternate method in which two regular U-bolts 30 are used instead of the two threaded studs 31.

Figure 8A:
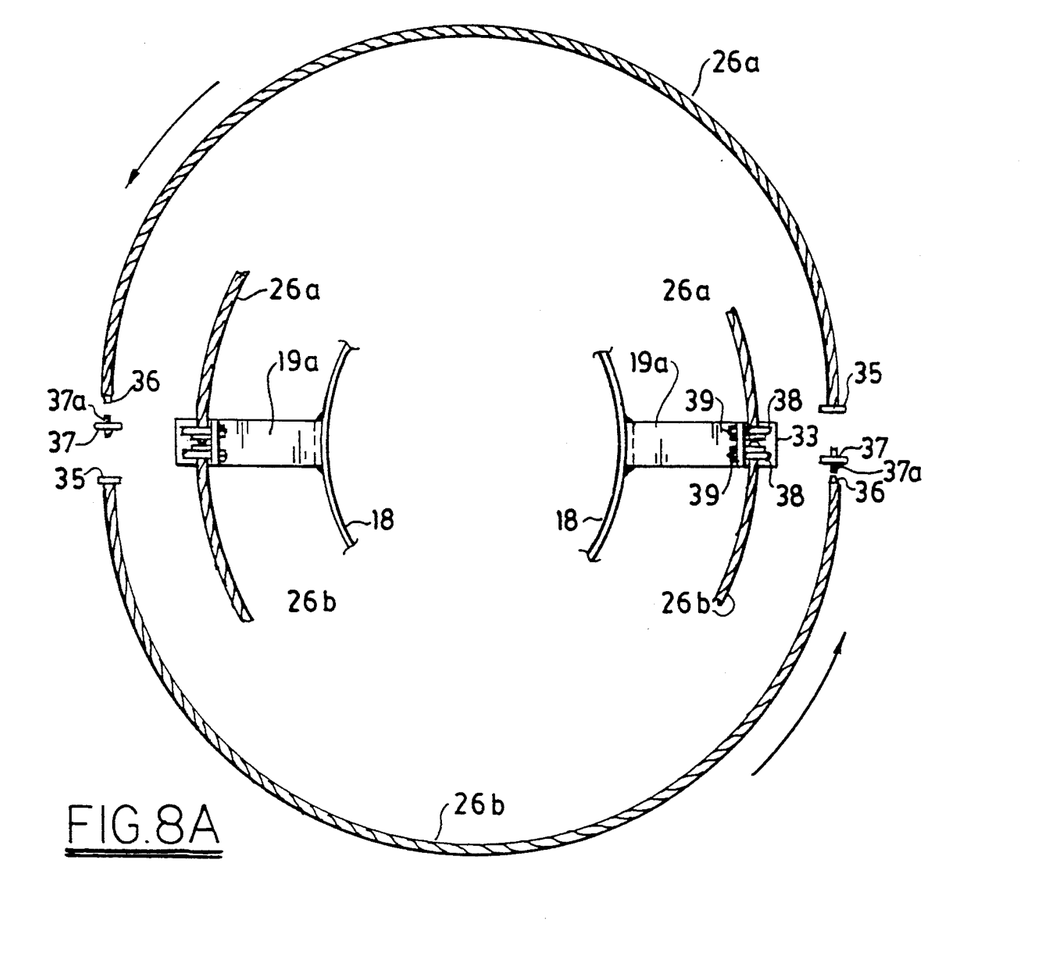
FIG. 8A is a somewhat diagrammatic side view of wire ropes arranged in conjunction with a spade holder.
Figure 8B:
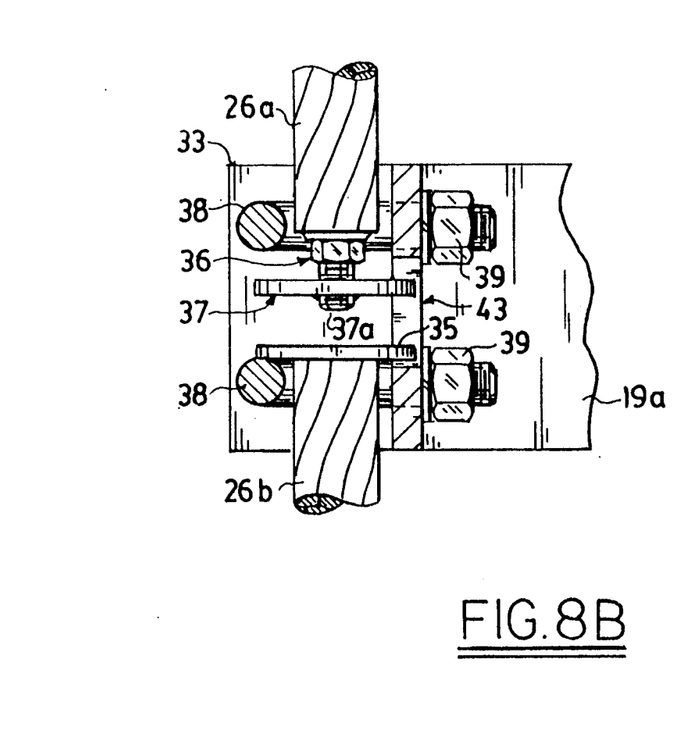
FIGS. 8B and 8C are enlarged sectional and top views, respectively, of the end connection of wire ropes to the spade holder shown in FIG. 8A.
Figure 8C:
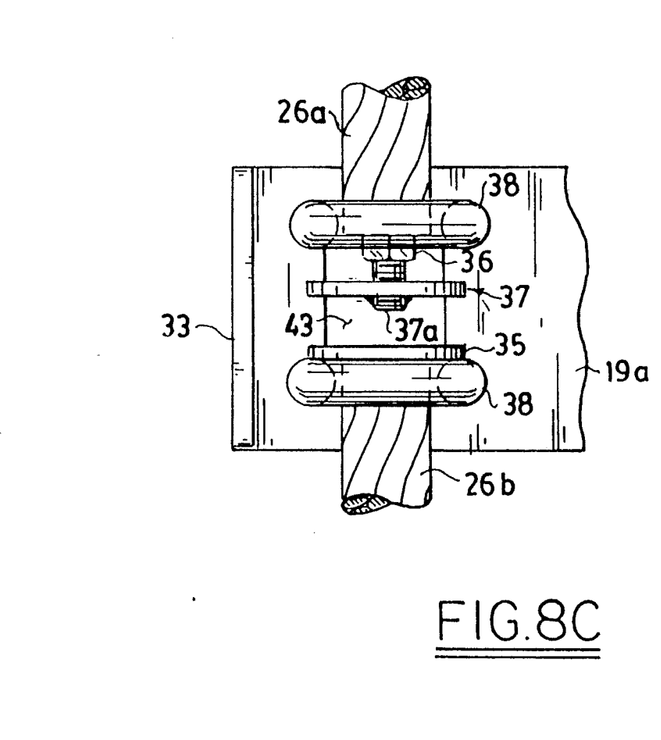

FIGS. 8A, 8B, and 8C depict the two wire ropes 26a and 26b coupled to spade holder 19 at each end. Each of the two wire ropes 26a and 26b has a heavy duty plain washer 35 welded squarely onto one of its ends; and likewise, a nut 36 at its opposite end. While two ropes are illustrated, each wheel may have a different number of wire ropes, such as three, four, or five. In assembling the device 17, ropes 26a and 26b are threaded thorough the tubular portion 22 of each spade holder 19 in the direction indicated by the arrow in FIG. 8A, after which washer assembly 37/37a is bolted onto nut 36; stud 37a is welded onto washer 37. This arrangement thus provides a mechanism to fixedly secure one end of wire ropes 26a, 26b and, an adjustable locking mechanism for the opposite end of each of the two wire ropes 26a and 26b.

Spade holder 19a, connected to wire ropes 26a and 26b, is referred to as the "keystone holder", differing from the other spade holders 19 in that it has a slot 43 to accommodate the plain washers 35 and 37, as well as two holes that receive two U-bolts 38 as shown in FIGS. 8B and 8C. Each end of wire ropes 26a and 26b is securely fastened to keystone holder 19a by means of nuts 39. As also shown in FIG. 8B, the U-Bolts 38 have added welds that serve as a stop as the nuts 39 are tightened. This stop assures that the wire ropes 26a and 26b are rotatably retained. The legs of U-bolts 38 are sufficiently spaced apart to provide ample clearance for rotation of the wire ropes 26a and 26b. The tubular portion 22 of the spade holder 19 is also large enough to provide rotational clearance.

Figure 3:
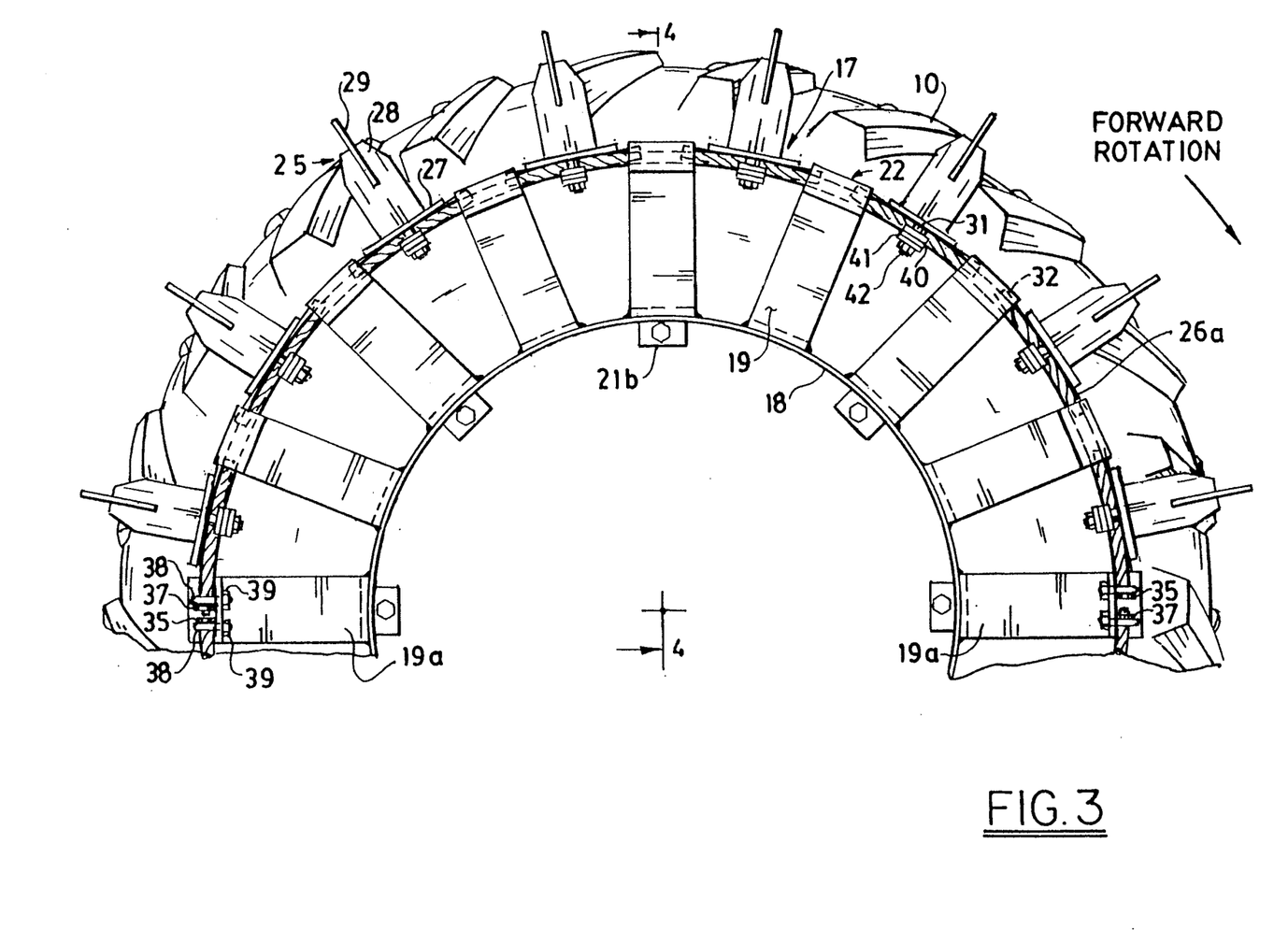
FIG. 3 is an enlarged partial side view of another embodiment of the invention with the wheel assembly omitted for clarity.
Figure 5A:
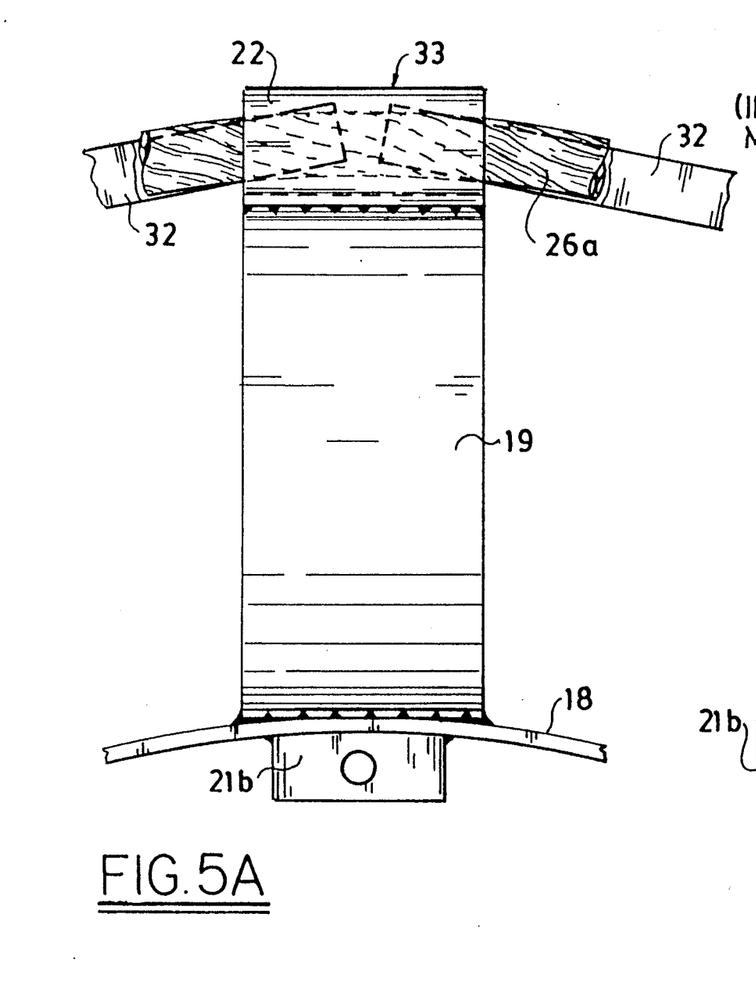
FIGS. 5A and 5B are detailed side and front views respectively of a spade holder in accordance with the invention.
Figure 5B:
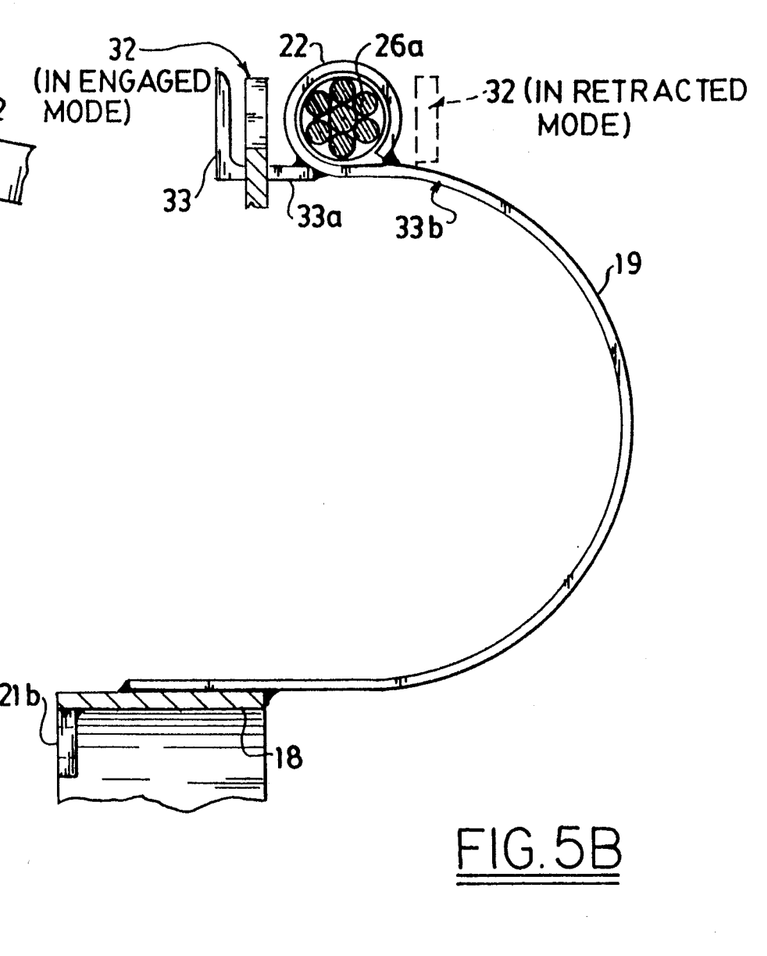

The method of preforming and preloading the wire ropes 26a and 26b is outlined in detail in the above-cited U.S. Pat. No. 4,508,150. It is emphasized that the device 17 is free standing and has no contact whatever with the companion tire 10. Each spade holder 19 is augmented by angle iron 33 as shown in FIGS. 5A and 5B. When the group of spade assemblies 25 is in an engaged mode, as depicted in FIGS. 3 and 4, for example, the bar presses against surface 33a of angle 33. Conversely, when in retracted mode as shown in the upper portion of FIG. 2, the same bar 32 assumes the dotted position in FIG. 5 and presses against the surface 33b of spade holder 19. It will be evident that bar 32 limits the motion of the spade relative to abutment surfaces 33a, 33b when the two are in contact.

As normally employed in various types of lifting hoists, etc., high tensile steel wire rope is wound on drums and passed over sheaves at operating radii in order of five to seven times its diameter. This is made feasible from the build-up of wires into strands and strands would into rope. As used in the present invention, the wire rope has a different application. Instead of being pulled over drums and sheaves, it functions as a powerful torsion spring having an over-center position. The strength of such a torsion spring can be adjusted to obtain satisfactory operation of device 17 by varying the initial curvature and the preload. The less the initial curvature, the greater will be the torsional force.

To install a group of spade assemblies 25 in its engaged mode, the wire ropes 26a, 26b are first preformed to have a curvature less than that of tubular portion 22 of spade holder 19, and then threaded through the series of tubular portions 22 of the group of spade holders 19. One of the ropes, for example 26a, is preloaded by placing a suitable gripping tool such as a pipe wrench at each end of the rope 26a, and then turning the rope in a clock-wise direction (with reference to FIG. 5B) some 30-45 degrees. Referring now to FIG. 7B, a spade assembly 25 is positioned adjacent to each of the two gripping tools and secured in their engaged position to wire rope 26a by tightening nuts 42, 42. When the gripping tools are released, limiting bar 32 bears on angle iron 33, and the two spade assemblies 25 oppose the torsional force exerted by the preloaded wire rope 26a, which is now longitudinally restrained, and the spade assemblies 25 are securely positioned in their engaged mode.

The entire group of spade assemblies 25 can be rotated into its retracted mode with one simple maneuver. The operator grasps the lug 29 of two spade assemblies 25 and pulls them toward himself, thereby rotating the wire rope 26a. Assuming 45 degrees of rotational preload, when rope 26a has rotated about 135 degrees, it will have reached a mid-point at which the torsional force now exerted by rope 26a promotes continued rotation. This is prevented by the bearing of limiting bar 32 on spade holder 19, as is best shown in FIG. 5B. The torsional force exerted by the wire rope 26a now secures the group of spade assemblies 25 in its retracted position.

The group of assemblies can be returned to its engaged position by simply grasping two assemblies and rotating in the opposite direction.

Referring now to FIGS. 2, 4 and 5B, wherein the device is illustrated in its engaged mode, it will be noted that the configuration of lug 29 is asymmetric, having a greater height at the end closest tire 10. The resulting preload is unbalanced and strongly urges bar 32 against surface 33a as the side of the spade assembly 25 corresponding to bar 33 is subjected to a somewhat higher penetration force. A rectangular lug can be used but would be less effective than the embodiment shown in FIG. 4.

The bar 32 and the angle iron 33 serve yet another function; they are abutments that limit counterrotational deflection of wire ropes 26a and 26b. Referring to FIG. 3, tire 10 rotates clockwise as a tractor is pulling forward. As the lugs 28 slice into the ground and develop drawbar pull, the spade assembly 25 tends to rotate counterclockwise. The rotation of the spade assembly is safely limited by contact between the trailing end of bar 32 and the leading end of angle iron 33, thereby assuring that the amount of deflection of the wire ropes 26a and 26b is within a safe tolerance. When the tractor is operating in reverse, the opposite ends of the bar 32 and the angle iron 33 function likewise. Furthermore, when a tractor is making sharp turns, excessive lateral deflection is prevented, because one side of bar 32 will press against the side of angle iron 33 or the side of tubular portion 22, depending on the direction of turn.

With the embodiments just described, the objectives set forth are achieved:

(1) Traction per se, is enhanced; due mainly to combination of two factors, namely (a) as the lugs 29 "dig deeper" the stronger subsurface layer of soil is utilized, and the prerequisite soil thrust is increased. The lugs 29 are capable of reaching into the 100-150 mm, at which depth cone index is said to be 902.5 kPa; or some 51% higher than that of top soil; these values pertaining to "Yolo Clay loam soil"; and (b) as the spade holders 19 are being compressed when subjected to vertical load from tractor's weight, the "footprint" from the device 17 becomes elongated; with the result that at least three of the lugs 289 are in ground contact simultaneously, the action resembling that of a tracked vehicle. It should be noted that operation of the device results in an essentially flat footprint, the length of which is less than the circumference of the device, due to compression in the area of the spade holders 19 and 19a. At the same time the retained wire ropes 26a and 26b cause the adjacent spade holders to be correspondingly expanded, so that the full circumference of the device is maintained.

(2) A smooth ride in fields is obtained, with the traction enhancing action in accordance with the invention. It will be evident that the spade holders 19 and 19a flex in unison with the companion tire 10 when the rotate and pull an implement. The inventor believes that this combination may give a smoother ride than a tractor without the device 17, particularly when the invention is used in conjunction with drive-tires which are either worn or "well worn" (as in case of model DB3 in the Walker Paper cited above, and actually discarded by a farmer), whereby the "culprit" of the vibration problem, i.e, the tire lugs, are reduced or even eliminated.

(3) Tire wear is reduced when this invention is employed, as the lugs 29 provide the gripping action in the fields, and thus reduce tire slip, the main reason for tire wear, as taught by the DB3, example in the Walker Paper above (45% and 86% reduction of tire wear). Also contributing to extended tire life is the feature that the device 17 is driven via the rim 11, thus allowing the tire 10 to operate at a somewhat lower inflation pressure. Risk of rim slip is therewith eliminated, as is risk of tire side wall buckling.

(4) Device 17 is easily and readily converted from "steel drive in fields" to "rubber drive on roads" as the two groups of the assemblies 25, secured to the wire ropes 26a and 26b, may change mode with one expeditious 180 degree flip maneuver.

(5) With this invention, the amount of soil compaction is reduced, and the companion tire 10 may be used without conventional ballast, such as a conventional solution of $CaCl_2$ in water. The significance of this can be appreciated by reference to Goodyear's 1990 *Farm Tire Handbook*, in which the recommended amount of liquid for a 20.8–38 size tire is no less than 1,521 lbs. (690 kg). This particular tire was discussed in the above noted ASAE Paper 86-1067. It is noteworthy that the DB3 tractor equipped with this tire was actually the lightest of four configurations tested. The DB3 tires were not ballasted and still performed impressively.

(6) Increased productivity and fuel economy of an agricultural wheeled tractor are achieved with this invention by virtue of its enhanced traction in fields. The embodiment described herein equals or exceeds the results obtained with the DB3-device, as reported in the above-mentioned Walker Paper, which reported that, the stated ". . . speed was increased by 62.2% . . . the speed was increased by 107% . . . ", referring to productivity; and, in regard to fuel savings, ". . . and fuel/km was decreased by 34% . . . and fuel/km was reduced by 61% by the DB3."; these values measured while "on dry soil surface" and "the wet, sodded soil", respectively.

Further while the invention has been described in detail with referenced embodiments, it will be understood by those skilled in the art that various changes may be made and equivalents may be substituted for elements thereof without departing from the scope of the invention. For example, lug 29 could be rectangular instead as oblique as depicted. In addition many modifications may be made to adapt the teachings of the invention to a particular situation without departing from the essential scope thereof. Therefore, it is intended that the invention not be limited to the particular embodiments disclosed, but the invention will include all embodiments falling within the scope of the appended claims.

What is claimed is:

1. Traction enhancing apparatus for a rubber tired vehicle of the type having a power driven wheel that includes a tire, a rim, a wheel disc and an axle shaft, comprising:
    a flexible frame means for forming an attachment base;
    a spacer means for securing said flexible frame means in spaced apart relationship to a wheel;
    a plurality of ground engaging spades, each of said spades having a base portion, a stem portion and a lug portion;
    a plurality of flexible spade holders, each comprising an outer anchor portion, and an inner portion that is attached to said flexible frame means;
    a plurality of wire ropes, connected together to form an endless loop, said ropes being threaded through said outer anchor portions of said spade holders and rotatable therein;
    a coupling means for fixedly securing said base portions of said spades to said wire ropes,
    whereby a said ground engaging spade can be pivoted by an operator about the longitudinal axis of a said wire rope to rotate the wire rope thereabout, thereby moving said ground engaging spades between a first ground engaging position and a second ground avoiding position, and said spades are held respectively in said first and second positions by a torsional force exerted by said rotated wire ropes.

2. The apparatus of claim 1, wherein said spade holders comprise semicircular bands of spring-like material that extend radially along said wheel from said flexible frame means to said wire ropes.

3. The apparatus of claim 2, wherein said wire ropes are disposed in end-to-end relationship and substantially describe a circle that is concentric with the wheel.

4. The apparatus of claim 2, wherein said outer anchor portions have abutment means and said base portions of said spades have limiting means for limiting relative motion therebetween,
    said abutment means bearing on said limiting means when said spades are disposed in a ground engaging position, and
    said limiting means bearing on said spade holders when said spades are disposed in a ground avoiding position,
    whereby said spades are stabilized.

5. The apparatus of claim 4, wherein said abutments means comprise angle-irons, and said limiting means comprise bars that extend to about the midpoints of said outer anchor portions.

6. The apparatus of claim 2, wherein said bands of spring-like material of said spade holders have resiliency in said radial direction and lack resiliency in a cross-radial direction.

7. The apparatus of claim 4, wherein said bands of spring-like material of said spade holders are formed from thin gauge, flat, high strength spring-like steel and have a width dimension that is substantially greater than the band thickness.

8. The apparatus of claim 1, wherein said lug portions of said ground engaging spades are fabricated of flat, thin gauge, high strength steel.

9. The apparatus of claim 8 wherein said each of said lug portions has a height dimension at a first end thereof that exceeds a height dimension at a second end thereof, said first end and said limiting means being disposed at a common side of said base portion of said spade.

10. The apparatus of claim 1 wherein said coupling means comprises a pair of U-shaped bolts.

11. The apparatus of claim 1, wherein said coupling means comprises two threaded studs secured to said base portion, a beveled bracket having openings aligned with said studs, a pair of beveled washers and nut means for interlocking said bracket and said studs.

12. The apparatus of claim 1, wherein each of said wire ropes includes a fixedly secured locking means at a first end thereof and an adjustable locking means at a second end thereof for retaining said wire ropes in mutual end-to-end relationship.

13. The apparatus of claim 1 wherein two of said outer anchor portions have holes bored therein and comprise U-shaped bolt means, insertable in said holes, for rotatably retaining said wire ropes, and nut means for securing said U-shaped bolt means.

14. The apparatus of claim 1 wherein said spacer means and said flexible frame means are in non-contacting relationship with a tire of said wheel.

15. The apparatus of claim 1 wherein said flexible frame means comprises a circular band rigidly connected to said spade holder assemblies, and said wire ropes are preloaded to form a torsion spring.

16. Traction enhancing apparatus for a rubber tired vehicle of the type having a power driven wheel that includes a tire, a rim, a wheel disc and an axle shaft, comprising:
    a torsion spring, comprising a plurality of wire ropes each having a longitudinal axis, said wire ropes being connected together in an endless loop;
    a resilient circular band, having a plurality of flexible spade holders secured thereto, said wire ropes being threaded through an outer anchor portion of each said spade holder and rotatable therein about said longitudinal axes, said loop of wire ropes being maintained by said spade holders in a substantially concentric relation with said circular band;

a spacer means for securing said circular band in spaced apart relationship to a wheel;

a plurality of ground engaging spades, each of said spades having a base portion, a stem portion and a lug portion; and a coupling means for fixedly securing said base portions of said spades to said wire ropes;

whereby pivotal motion of a said ground engaging spade about said wire ropes rotates said wire ropes about said longitudinal axis and moves said ground engaging spades between a first ground engaging position and a second ground avoiding position, and said spades are urged respectively into said first and second positions by torsional forces exerted by said wire ropes.

17. The apparatus of claim 16, wherein said spade holders comprise semicircular bands of spring-like material that extend radially along said wheel from said circular band to said wire ropes, and angular abutment means, disposed adjacent said outer anchor portions, for limiting relative rotation between said wire ropes and said outer anchor portions.

18. The apparatus of claim 16, wherein said outer anchor portions have abutment means and said base portions of said spades have limiting means respectively for limiting relative motion therebetween, said abutment means bearing on said limiting means when said spades are disposed in a ground engaging position, and said limiting means bearing on said outer anchor portions when said spades are disposed in a ground avoiding position, whereby said spades are stabilized.

19. The apparatus of claim 16 wherein said said circular band and said spade holders are in non-contacting relationship with a tire of said wheel.

20. The apparatus of claim 16 wherein said torsion spring is preloaded to increase the force exerted thereby.

* * * * *